United States Patent [19]
Taplin, III et al.

[11] 3,765,944
[45] Oct. 16, 1973

[54] BATTERY HAVING A MOLTEN ALKALI METAL POLYSULFIDE CATHOLYTE AND CARBON COATED METALLIC ELECTRODE FOR USE THEREIN

[75] Inventors: William H. Taplin, III, Lafayette; Robert O. Lindblom, Walnut Creek; Terry L. Caskey, Concord, all of Calif.

[73] Assignee: The Dow Chemical Company, Midland, Mich.

[22] Filed: Nov. 26, 1971

[21] Appl. No.: 202,649

[52] U.S. Cl. ............................... 136/83 R, 136/121
[51] Int. Cl. ........................................... H01m 35/02
[58] Field of Search .................... 136/83, 120–122, 136/100 M, 6.20; 75/138, 168; 117/61, 106, 117/226, 46 CG, 127

[56] References Cited
UNITED STATES PATENTS

| | | | |
|---|---|---|---|
| 2,154,312 | 4/1939 | MacCallum | 136/121 |
| 3,038,019 | 6/1962 | Robinson | 136/83 R |
| 3,400,020 | 9/1968 | Carpino et al. | 136/120 |
| 3,413,150 | 11/1968 | Kummer et al. | 136/6 |
| 3,476,602 | 11/1969 | Brown et al. | 136/83 R |
| 3,679,480 | 7/1972 | Brown et al. | 136/83 T |

*Primary Examiner*—Anthony Skapars
*Attorney*—William M. Yates et al.

[57] ABSTRACT

Disclosed is an electrode having a metallic substrate covered by an adhering carbon coating. The metallic substrate consists essentially of magnesium or certain alloys containing magnesium, with the carbon coating being from 50 to 10,000 A thick. The electrodes are compatible with molten alkali metal sulfides since they do not passivate, i.e., lose their conductivity, when placed in contact with the sulfide melts for extended periods of time.

8 Claims, No Drawings

3,765,944

BATTERY HAVING A MOLTEN ALKALI METAL POLYSULFIDE CATHOLYTE AND CARBON COATED METALLIC ELECTRODE FOR USE THEREIN

BACKGROUND OF THE INVENTION

Recent battery technology, such as that disclosed in U.S. Pat. No. 3,476,602, discloses the use of a molten sodium anode and a molten sodium polysulfide catholyte separated by an alkali metal ion permeable membrane as electrolyte. In one embodiment of such a battery, the membrane is in the form of a multiplicity of hollow fine fibers of glass which are filled with molten sodium and immersed in a reservoir of molten sodium polysulfide. By employing as the electrolyte a large number of fibers, which also serve as containers for the molten sodium anode, a large anode area is made available. A battery cell having such a configuration is more fully described in co-pending application Ser. No. 70,147 filed Sept. 8, 1970 by William E. Brown and William H. Taplin, now abandoned. The electromotive force present in such a system causes the alkali metal to ionize. The positive ion passes through the membrane leaving its electron free to pass along an external circuit. The electron enters the alkali metal polysulfide catholyte thereby completing the circuit. Such a cell configuration affords a potentially high volumetric efficiency (watts/cu. ft. of battery). However, the large anode area must be matched by an equally large cathode area in order to avoid high current density at the cathode. Also, in order to realize the high volumetric efficiency potential, it is necessary to minimize electrical resistance within the battery. Reduction of internal resistance is accomplished by placing the cathode directly into the molten alkali metal polysulfide as close to the sodium filled fiber as possible. In order to place the maximum cathode area in close proximity to the fibers, certain cathode configurations are desirable. For example, the cathode is conveniently employed in the form of wires, parallel to and between the electrolyte fibers, connected to a common terminal. Alternatively, the cathode may be in the form of a foil or screen which can be arranged in close proximity to the glass fibers. A conductive foil is preferred due to the greater surface area provided by this configuration. An efficient configuration for the cell is to roll the fibers up with the foil cathode in jelly roll fashion thus providing maximum cathode area in close proximity to the electrolyte. The cathode of the instant invention must be of a material having an affinity for carbon which is sufficiently malleable and ductile to be readily shaped in the form of a wire, screen or foil. The cathode must also resist formation of a sulfide layer on its surface from the molten polysulfide catholyte since such a layer tends to increase the internal resistance of the cell. The cathode surface should also be resistant to corrosion by the molten alkali metal polysulfide and not melt at temperatures of the catholyte. Additionally, the electrode should retain its conductivity upon prolonged exposure to molten alkali metal polysulfides.

Existing electrode materials fail to meet the proceeding requirements in one or more respects. Graphite does not develop a highly resistant sulfide layer and is not corroded seriously by molten sodium polysulfide; however, it does not have an adequate conductivity and is not readily put in the form of a wire or foil. Aluminum and magnesium are readily formed into wires or foils and have sufficient conductivity. These metals corrode only until a surface layer of the metal sulfide is formed which passivates the surface of the metal to further corrosion. However, the sulfide layers have high electrical resistance and the conductivity of such an electrode drops off to an inadequate level rapidly when in contact with molten alkali metal polysulfides. Iron and other metals which are suitably workable into wires or foils form sulfide layers which not only have high electrical resistances but also fail to passivate the metal surface to further corrosion by the sodium polysulfide catholyte.

It is a principal object of the present invention to provide an electrode for use in a molten alkali metal polysulfide environment.

An additional object is to provide such an electrode in the form of a wire, screen or foil.

A further object is to provide such an electrode which will maintain a high degree of conductivity upon prolonged contact with molten alkali metal polysulfide.

A further object is to provide such an electrode which will not be seriously corroded by molten alkali metal polysulfide.

SUMMARY OF THE INVENTION

The present invention is an electrode having utility in corrosive environments such as molten alkali metal polysulfides. The electrode comprises a metallic substrate coated with an adhering coating consisting essentially of carbon in a layer having a thickness of from about 50 to about 10,000 A. The metal substrate consists essentially of one or more of the following metal compositions:

a. magnesium,
b. an alloy of aluminum and magnesium comprising at least 0.1 weight percent magnesium,
c. an alloy of cadmium and magnesium comprising at least 1 weight percent magnesium,
d. an alloy of zinc and magnesium comprising at least 10 weight percent magnesium,
e. an alloy of aluminum, cadmium and magnesium comprising at least 0.5 weight percent magnesium,
f. an alloy of aluminum, zinc and magnesium comprising at least 0.5 weight percent magnesium,
g. an alloy of cadmium, zinc and magnesium comprising at least 1 weight percent magnesium, or
h. an alloy of aluminum, cadmium, zinc and magnesium comprising at least 1 weight percent magnesium.

As used herein, the term "consisting essentially of" is intended to mean that those substances which materially effect the essential nature of the composition are excluded. The essential nature of the electrodes of the present invention is that they do not exhibit resistivity in excess of 10 ohms/cm.$^2$ of surface after being immersed for 60 days in a melt of sodium tetrasulfide at 300° C. Additionally the electrode should not corrode at an average rate of greater than 0.05 mils/year after 60 days in sodium tetrasulfide at 300° C.

DETAILED DESCRIPTION

In general, the electrode is prepared by applying a carbon coating to a metallic substrate of the desired configuration. The coating can be applied by any of the conventional methods for the application of such coatings. For example, the carbon may be applied from an aqueous suspension of colloidal particles, such as Aquadag, an aerosol of graphite may be sprayed on or soot or lampblack may be applied as by suspending the substrate in a carbonaceous flame. Vacuum evaporation of carbon onto the substrate may also be employed. Preferably, the thickness of the carbon coating ranges from 100 to 6,000 A.

The substrate is generally pretreated to remove metal oxides before application of the carbon layer. Normally the metal substrate is contacted at room temperature with 5 percent aqueous NaOH for about 10 seconds to remove metal oxide and washed with water before application of the carbon. A convenient method of applying carbon from Aquadag is to bake the metal substrate at 300° C for 15 minutes, contact it with the Aquadag suspension, and rebake at 300° C. When the carbon coating is applied from a carbonaceous flame, the metal surface is first abraded in order to remove any oxide layer.

Two methods are used for vacuum evaporating carbon onto the substrate at a pressure of less than $1 \times 10^{-3}$ torr. These methods are:

A. Two pointed carbon rods are placed in contact and spring loaded to insure contact. A high current (A.C.) is passed through the rods to produce temperatures high enough to vaporize the carbon at the high resistance point of contact.

B. A mass of graphitic or other form of carbon is placed on a water cooled copper plate and bombarded with electrons from a variable 30 KV, 300 ma electron beam source and heated at the point of bombardment to a temperature sufficient to evaporate the carbon.

In each case the vaporized carbon is allowed to condense on the substrate to the desired thickness as determined by a Sloan DT M-2 deposit thickness monitor.

The metal substrate should be of a thickness of at least about 50 A to provide good conductivity and resistance to attack by the alkali metal polysulfide. The substrate can be applied to a core of electrically conductive material such as copper to insure its physical integrity when very thin wires or foils are involved.

Preferred substrate compositions are those which can readily be shaped into foils. Any alloy of aluminum and magnesium containing less than 5 percent magnesium is especially desirable for use as the substrate material with the amount of magnesium ranging from 0.5 to 2 percent being considered optimal.

It has further been discovered that the conductivity of the carbon coated electrode of the instant invention may actually increase beyond that of the uncoated electrode upon conditioning with a molten alkali metal polysulfide. The time required for such treatment to condition the electrode will vary depending on the temperature and composition of the melt and the composition of the metal substrate. In some instances the conductivity decreases at first, but then comes back up to and exceeds the original conductivity. In general, the conditioning period is from 1 to 30 days. The conditioning is deemed complete when essentially no further decrease in resistance is observed over a period of seven days. This conditioning phenomenon is observed regardless of whether a current is passed through the electrode during its immersion in the sulfide melt.

The following examples will serve to further illustrate the utility of the disclosed electrodes in molten alkali metal polysulfides. In each of the following examples, except where otherwise specified, test probes of the material being tested were prepared, connected to conductors and placed in a tube containing molten sodium tetrasulfide to a depth such that 10 square centimeters of each probe was exposed to the melt. The system was maintained at 300° C. with direct current being passed between the probes at a potential difference of 0.1 volt. The polarity was alternated every 30 minutes.

Allowing for concentration polarization and including the solution resistance, the resistance of the test probes was calculated from the formula:

$$R = e_1 - e_2/i$$

where R is the calculated resistance
$e_1$ = set voltage, i.e. 0.10 volts
$e_2$ = instantaneous voltage immediately after current cut-off
$i$ = current in amps The invention is further illustrated by the following examples in which resistivity is determined by the equation resistivity $= R \times 2/10$ cm.$^2$ where 2 is the number of probes and 10 cm.$^2$ is the area exposed to the catholyte.

EXAMPLE I

A 5/16 inch wide by 10 mil thick sheet of primary magnesium was abraded with emery paper and placed in a vacuum chamber in which carbon was evaporated and deposited by electron beam deposition to form a layer approximately 2500 A thick. After coating, the magnesium strip was cut in two pieces, connected to two conductors and placed in a tube containing molten sodium tetrasulfide to a depth such that 10 sq. centimeters of each probe was exposed to the melt with the probes lieing about 3 millimeters apart.

Allowing for the concentration polarization and including the solution resistance, the total resistivity was calculated to be 0.32 ohm/cm.$^2$. After 1 month at 300° C. in $Na_2S_4$, the same test probe resistivity was 0.27 ohm/cm.$^2$. Resistivity increased to 0.42 ohm/cm.$^2$ after 3 1/2 months and was found to have dropped to 0.41 ohm/cm.$^2$ after 18 months.

Probes made of essentially pure magnesium but not carbon coated were similarly tested and found to have an initial resistivity of 3000 $\Omega$/cm.$^2$ which increased to 4700 $\Omega$/cm$^2$ in one week.

EXAMPLE II

Another set of strips, 12 mils thick and consisting of magnesium alloyed with 6 percent aluminum and 1 percent zinc, was spray coated with fine graphite particles from a solution containing a dispersant and a minor amount of a binder. An approximately 5000 A thick coating of graphite remained after the solvent had evaporated. The carbon coated electrode was placed in a 300° C. sodium tetrasulfide melt with current applied as in Example I. The initial resistivity, which was determined to be 20.5 ohm/cm.$^2$, dropped to 1.8 ohm/cm.$^2$ in one week. The resistivity remained at this low level until the probes were removed for inspection after an immersion period of 2 1/2 months. The graphite surface was found to be continuous and no loss of weight was observed.

EXAMPLE III

A sheet of 3/4 mil thick aluminum foil was first vacuum coated with aluminum and then the vacuum deposited metal was gradually graded through an Al/Mg mixture to all magnesium for a total magnesium-containing coating of about 5000 A. The magnesium coated sheet was then spray coated with graphite to a thickness of ≈5000 A and subjected to a sodium sulfide melt as before. Resistivity was initially determined to be 6.5 ohm/cm.$^2$ and rose to 11.5 ohm/cm.$^2$ after two days. The resistivity then dropped to a low of 2.8 ohm/cm.$^2$ in about 5 weeks and remained at that level for over 18 months.

EXAMPLE IV

Electrodes were prepared from alloys of the compositions set out in Table I.

TABLE I

| Alloy | Percentage by Weight Composition | | | | | | | |
|---|---|---|---|---|---|---|---|---|
| | Si | Fe | Cu | Mn | Mg | Cr | Zn | Al |
| 1100 | 1.0 | | | | | | | Remainder. |
| 5005 | 0.4 | 0.7 | 0.2 | 0.2 | 0.6 | | 0.1 | 0.25 Do. |
| 5052 | 0.45 | | 0.1 | 0.1 | 2.5 | 0.25 | 0.1 | Do. |
| 5056 | 0.3 | 0.4 | 0.1 | 0.1 | 5.0 | 0.15 | 0.1 | Do. |
| 6061 | 0.6 | 0.7 | 0.25 | 0.15 | 1.0 | | 0.2 | 0.25 Do. |

IV-A. The 5056 alloy, 0.0009 inch thick, was annealed to 350° C., cooled and abraded with fine sand paper. The strips were coated with spray-on graphite and placed in $Na_2S_4$ at 300° C. under applied current. Table 4-a compares resistance with time for this experiment.

TABLE 4a

| Date | Time | Voltage | Current ma | Temp. | R Ω |
|---|---|---|---|---|---|
| 3-6 | 2:42 | 0.100–0.060 | 44 | 302° | 0.91 |
| | 3:35 | 0.100–0.060 | 52 | | 0.77 |
| 3-7 | 7:44 | 0.100–0.065 | 80 | 302° | 0.44 |
| 3-8 | 7:43 | 0.100–0.065 | 90 | 303° | 0.44 |
| 3-11 | 7:54 | 0.100–0.070 | 78 | 307° | 0.39 |
| 3-14 | 7:55 | 0.100–0.065 | 65 | 294° | 0.53 |
| 3-18 | 8:12 | 0.100–0.063 | 73 | 301° | 0.51 |
| 3-25 | 8:02 | 0.100–0.060 | 90 | 308° | 0.45 |
| 4-1 | 8:38 | 0.100–0.075 | 54 | 294° | 0.46 |
| 4-8 | 9:12 | 0.100–0.065 | 91 | 318° | 0.49 |
| 4-15 | 11.09 | 0.100–0.070 | 67 | 291° | 0.45 |
| 4-22 | 1:47 | 0.100–0.055 | 94 | 304° | 0.58 |
| 4-29 | 9:49 | 0.100–0.055 | 96 | 304° | 0.47 |
| 5-6 | 8:25 | 0.100–0.060 | 98 | 327° | 0.41 |

IV-B. Test probes of alloy 5052, 0.0009 inches thick, were annealed, cooled and sanded on both surfaces. They were then spray coated with graphite. The following table sets out the resistance determined at various times in $Na_2S_4$ at temperatures from 291° to 327° C.

TABLE 4b

| Date | Time | Voltage | Current ma | R Ω |
|---|---|---|---|---|
| 3-6 | 2:48 | 0.100–0.060 | 29 | 1.4 |
| | 3:34 | 0.100–0.040 | 33 | 1.8 |
| 3-7 | 7:46 | 0.100–0.065 | 78 | 0.45 |
| 3-8 | 7:46 | 0.100–0.055 | 98 | 0.45 |
| 3-11 | 7:52 | 0.100–0.065 | 77 | 0.45 |
| 3-14 | 7:51 | 0.100–0.065 | 65 | 0.53 |
| 3-18 | 8:10 | 0.100–0.060 | 73 | 0.55 |
| 3-25 | 8:01 | 0.100–0.055 | 90 | 0.50 |
| 4-1 | 8:35 | 0.100–0.060 | 72 | 0.55 |
| 4-8 | 7:10 | 0.100–0.060 | 84 | 0.48 |
| 4-15 | 11:07 | 0.100–0.065 | 64 | 0.55 |
| 4-22 | 11:15 | 0.100–0.050 | 94 | 0.53 |
| 4-29 | 9:48 | 0.100–0.075 | 85 | 0.29 |
| 5-6 | 8:24 | 0.100–0.060 | 95 | 0.42 |

IV-C. Alloy 5052, 0.9 mil unannealed, was coated with a water dispersed "Aquadag" concentrate after having been abraded with water proof silicon carbide paper. Test probes were made and resistance determined in $Na_2S_4$ ranging from 296° to 304° C. Resistance as a function of time is set out in Table 4-c.

TABLE 4c

| Date | Time | Voltage | Current ma | R Ω |
|---|---|---|---|---|
| 3-8 | 3:10 | 0.100–0.065 | 68 | 0.51 |
| | 3:48 | 0.100–0.070 | 80 | 0.37 |
| 3-11 | 7:47 | 0.100–0.080 | 77 | 0.26 |
| 3-12 | 8:42 | 0.100–0.085 | 50 | 0.30 |
| 3-13 | 7:52 | 0.100–0.080 | 74 | 0.27 |
| 3-14 | 7:48 | 0.100–0.065 | 77 | 0.45 |
| 3-15 | 7:46 | 0.100–0.070 | 86 | 0.35 |
| 3-18 | 8:06 | 0.100–0.060 | 36 | 1.1 |
| 3-19 | 8:13 | 0.100–0.070 | 78 | 0.38 |
| 3-25 | 7:56 | 0.100–0.065 | 95 | 0.37 |
| 4-1 | 8:31 | 0.100–0.060 | 93 | 0.43 |
| 4-8 | 9:07 | 0.100–0.055 | 100 | 0.45 |
| 4-15 | 11:02 | 0.100–0.050 | 97 | 0.51 |
| 4-22 | 1:39 | 0.100–0.055 | 86 | 0.52 |
| 5-6 | 8:17 | 0.100–0.050 | 99 | 0.51 |

IV-D. A 0.035 inch thick sheet of alloy 5005 was cut into test probes, sanded and coated with spray graphite. The following table sets out resistance as a function of time.

TABLE 4d

| Date | Time | Voltage | Current Ma | R Ω |
|---|---|---|---|---|
| 3-12 | 9:02 | 0.100–0.070 | 62 | 0.48 |
| | 12:56 | 0.100–0.030 | 26 | 2.7 |
| | 3:47 | 0.100–0.035 | 19 | 3.4 |
| 3-13 | 7:49 | 0.100–0.035 | 13 | 5.0 |
| 3-14 | 7:46 | 0.100–0.052 | 12.5 | 6.0 |
| 3-15 | 7:44 | 0.100–0.020 | 18 | 3.9 |
| 3-18 | 8:01 | 0.100–0.050 | 31 | 1.6 |
| 3-19 | 8:12 | 0.100–0.52 | 37 | 1.3 |
| 3-21 | 8:03 | 0.100–0.060 | 46 | 0.87 |
| 3-25 | 7:55 | 0.100–0.040 | 87 | 0.69 |
| 4-1 | 8:29 | 0.100–0.060 | 82 | 0.49 |
| 4-8 | 9:04 | 0.100–0.070 | 76 | 0.39 |
| 4-15 | 10:35 | 0.100–0.065 | 100 | 0.35 |
| 4-22 | 1:30 | 0.100–0.070 | 82 | 0.37 |
| 4-29 | 9:44 | 0.100–0.075 | 100 | 0.25 |
| 5-6 | 8:16 | 0.100–0.070 | 100 | 0.30 |

IV-E. The 0.0009 inch thick 5052 alloy was abraded but not carbon coated and placed in $Na_2S_4$ at temperatures ranging from 298° to 302° C. The following table sets out the change in resistance over a period of immersion of nearly three months.

TABLE 4e

| Date | Time | Voltage | Current ma | R Ω |
|---|---|---|---|---|
| 3-12 | 9:00 | 0.100–0.060 | 0.28 | 144 |
| | 12:54 | 0.100–0.050 | 1.5 | 36 |
| | 3:45 | 0.100–0.065 | 1.5 | 23 |
| 3-13 | 7:47 | 0.100–0.065 | 2.5 | 14 |
| 3-14 | 7:44 | 0.100–0.045 | 2.5 | 22 |
| 3-15 | 7:43 | 0.100–0.040 | 2.5 | 24 |
| 3-18 | 8:00 | 0.100–0.040 | 2.5 | 24 |
| 3-19 | 8:11 | 0.100–0.040 | 2.5 | 24 |
| 3-25 | 7:54 | 0.100–0.020 | 3.5 | 23 |
| 4-1 | 8.28 | 0.100–0.20 | 3.5 | 23 |
| 4-8 | 9:03 | 0.100–0.20 | 3.5 | 23 |
| 4-15 | 10:34 | 0.100–0.020 | 3.0 | 27 |
| 4-22 | 1:35 | 0.100–0.020 | 3.0 | 27 |
| 4-29 | 9:43 | 0.100–0.020 | 2.5 | 32 |
| 5-6 | 8:15 | 0.100–0.020 | 2.5 | 32 |
| 5-23 | 10:20 | 0.100–0.020 | 2.0 | 42 |

IV-F. Two test probes of alloy 5005 were coated with fine carbon particles by passing the abraded strips through a smoky kerosene flame. The probes were immersed in $Na_2S_4$ at a temperature of from 299° to 304° C.

TABLE 4f

| Date | Time | Voltage | Current ma | R Ω |
|---|---|---|---|---|
| 3-25 | 3:30 | 0.100–0.075 | 5.5 | 4.5 |
| 3-27 | 7:43 | 0.100–0.035 | 5.5 | 11.8 |
| 4-1 | 8:14 | 0.100–0.050 | 8.5 | 5.9 |
| 4-8 | 8:16 | 0.100–0.045 | 17 | 3.2 |
| 4-22 | 1:21 | 0.100–0.040 | 37 | 1.6 |
| 5-6 | 8:04 | 0.100–0.040 | 42 | 1.4 |

IV-G. Test probes were prepared from a sample of alloy 5052 which was 0.0008 inches thick. The foil was first coated with a mixture of 5 percent sodium caseinate and 95 percent lampblack. The solids were mixed with 20 times their weight of water and applied with abrasion. Table 4-g sets out resistance as a function of time.

TABLE 4g

| Date | Time | Voltage | Current ma | R Ω |
|---|---|---|---|---|
| 4-17 | 2:16 | 0.100–0.085 | 19 | 0.79 |
| 4-18 | 7:40 | 0.100–0.045 | 97 | 0.57 |
| 4-19 | 8:37 | 0.100–0.055 | 97 | 0.46 |
| 4-22 | 12:40 | 0.100–0.065 | 94 | 0.37 |
| 4-29 | 8:14 | 0.100–0.065 | 100 | 0.35 |
| 5-6 | 7:55 | 0.100–0.070 | 88 | 0.34 |

IV-H. Aluminum alloy 1100, containing no magnesium was coated with the same lampblack and casein as used in IV-G and abraded while wet. Test probes were made and tested in $Na_2S_4$ at a temperature of from 302° to 305° C. Table 4-h sets out resistance as a function of time.

TABLE 4h

| Date | Time | Voltage | Current ma | R Ω |
|---|---|---|---|---|
| 4-18 | 8:36 | 0.100–0.060 | 17 | 2.4 |
| 4-19 | 8:44 | 0.100–0.015 | 5.5 | 15.5 |
| 4-22 | 12:15 | 0.100–0.015 | 3.5 | 24.5 |
| 4-24 | 7:42 | 0.100–0.015 | 3.0 | 28.4 |
| 4-29 | 8:14 | 0.100–0.015 | 2.5 | 34 |
| 5-6 | 7:54 | 0.100–0.015 | 2.5 | 34 |

The data of Tables 4-a through 4-h indicate that the resistance of aluminum alloys containing relatively small amounts of magnesium, does not increase when coated with carbon and immersed in molten sodium tetrasulfide. In general, the resistance actually decreases. When an uncoated aluminum/magnesium alloy was tested the resistance went down originally. However, the resistance increased to a high level after this initial reduction. When the test probes were made of an aluminum alloy containing no magnesium, the resistance increased rapidly to a high level despite the fact that the probes were carbon coated.

EXAMPLE V

Two test probes were made from an alloy of pure Zn + 5 percent Mg. and sprayed with graphite. Table 5 sets out resistance as a function of time during immersion in $Na_2S_4$ at a temperature from 300° to 303° C. It will be seen that a content of 5 percent magnesium in this binary alloy was not very effective, although a fall-off in resistance did follow the usual initial rise.

TABLE V

| Date | Time | Voltage | Current ma | R Ω |
|---|---|---|---|---|
| 5-23 | 4:00 | 0.100–0.080 | 38 | 0.53 |
| 5-24 | 8:08 | 0.100–0.040 | 48 | 1.25 |
| 5-27 | 8:08 | 0.100–0.050 | 29 | 1.7 |
| 5-28 | 11:09 | 0.100–0.040 | 32 | 1.9 |
| 6-3 | 9:20 | 0.100–0.025 | 25 | 3.0 |
| 6-11 | 8:00 | 0.100–0.040 | 59 | 1.0 |
| 6-17 | 7:57 | 0.100–0.045 | 50 | 1.1 |
| 6-24 | 1:43 | 0.100–0.040 | 44 | 1.4 |
| 7-8 | 9:11 | 0.100–0.045 | 16 | 3.4 |

EXAMPLE VI

Two test probes were prepared from an alloy of pure Cd + 0.1 percent Mg. The probes were coated with spray graphite immersed in $Na_2S_4$ at a temperature of from 300° to 303° C. Table 6 sets out resistance as a function of time. Again, the desirability of a higher magnesium content is indicated.

TABLE 6

| Date | Time | Voltage | Current ma | R Ω |
|---|---|---|---|---|
| 5-23 | 4:04 | 0.100–0.090 | 44 | 0.23 |
| 5-24 | 8:09 | 0.100–0.070 | 82 | 0.37 |
| 5-27 | 8:10 | 0.100–0.075 | 90 | 0.28 |
| 5-28 | 11:10 | 0.100–0.075 | 90 | 0.28 |
| 6-3 | 9:21 | 0.100–0.065 | 97 | 0.36 |
| 6-11 | 8:01 | 0.100–0.075 | 98 | 0.25 |
| 6-17 | 7:58 | 0.100–0.070 | 97 | 0.31 |
| 6-24 | 1:44 | 0.100–0.070 | 100 | 0.30 |
| 7-8 | 9:12 | 0.100–0.070 | 75 | 0.40 |
| 7-29 | 2:31 | 0.100–0.060 | 80 | 0.50 |
| 8-22 | 10:33 | 0.100–0.060 | 85 | 0.47 |

EXAMPLE VII

Two test probes were made from pure cadmium cut into 5/16 inch wide strips and coated with spray graphite. About 5 cm.$^2$ of each probe was immersed in $Na_2S_4$ at a temperature of from 300° to 303° C. Table 7 sets out resistance as a function of time.

TABLE 7

| Date | Time | Voltage | Current ma | R Ω |
|---|---|---|---|---|
| 5-24 | 3:39 | 0.100–0.025 | 22 | 3.4 |
| 5-27 | 8:05 | 0.100–0.020 | 5.0 | 16 |
| 5-28 | 11:07 | 0.100–0.020 | 4.5 | 18 |
| 6-3 | 9:15 | 0.100–0.005 | 2.0 | 47 |
| 6-11 | 8:57 | 0.100–0.005 | 1.2 | 80 |
| 6-17 | 7:54 | 0.100–0.005 | .8 | 120 |
| 6-24 | 7:39 | 0.100–0.015 | .9 | 95 |
| 7-8 | 9:09 | 0.100–0.010 | .4 | 220 |
| 7-29 | 2:27 | 0.100–0.010 | 0.3 | 300 |
| 8-22 | 10:30 | 0.100–0.005 | 0.2 | 470 |

It is obvious from Table 7 that resistance increases steadily to an unacceptably high level when a pure cadmium electrode is employed.

EXAMPLE VIII

In order to establish a conditioning effect obtained by treating the electrode with a molten alkali metal polysulfide in the preceding manner the following experiment was carried out:

Primary magnesium was coated with spray-on graphite, was held in molten $Na_2S_4$ for 2 1/2 months and washed with water upon removal. Primary magnesium was coated with spray-on graphite for a second specimen and untreated magnesium used as a third. Test strips which were 5/16 inch wide and 10 mils thick were used to determine resistance. The following table summarizes the relative resistances of the three specimens.

Resistance

| Test | Mg | C Coated Mg | C Coated Mg Treated in $Na_2S_4$ |
|---|---|---|---|
| Dipped in Saturated NaCl | 300Ω | 300Ω | 120Ω |
| Evolution of $H_2$ | High | Moderate | Low |

EXAMPLE IX

Two probes were prepared from primary magnesium and coated with spray graphite after abrasion. The probes were immersed in molten $Na_2S_4$ at 300° C. No current was passed between the probes except at the time of its measurement. Table 9 summarizes resistance as a function of time.

TABLE 9

| Date | Time | Voltage | Current ma | R Ω |
|---|---|---|---|---|
| 5-23 | 4:06 | 0.100–0.020 | 70 | 1.1 |
| 5-24 | 8:02 | 0.100–0.020 | 27 | 2.9 |
| 5-27 | 8:07 | 0.100–0.025 | 43 | 1.7 |
| 5-28 | 11:08 | 0.100–0.025 | 42 | 1.8 |
| 6-3 | 9:19 | 0.100–0.025 | 125 | 0.6 |
| 6-11 | 8.59 | 0.100–0.015 | 61 | 1.4 |
| 6-17 | 7:55 | 0.100–0.015 | 31 | 2.7 |

EXAMPLE X

A sample of 5005 alloy was coated with Aquadag after being washed with a NaOH solution. The sample was cut into test probes and placed in molten potassium tetrasulfide. Initial resistivity was 2.5 ohm/cm.$^2$. This increased to 10 ohm/cm.$^2$ after 1 day but dropped back to 2.5 ohm/cm.$^2$ after 7 days at the higher level.

We claim:

1. An electrode having utility in corrosive environments which comprises a metallic substrate coated with an adhering layer consisting essentially of carbon, said carbon layer having a thickness of from about 50 to about 10,000 A and said electrode being further defined in that the metal substrate consists essentially of at least one of the following metals or alloys:
   a. magnesium,
   b. an alloy of aluminum and magnesium comprising at least 0.1 weight percent magnesium,
   c. an alloy of cadmium and magnesium comprising at least 1 weight percent magnesium,
   d. an alloy of zinc and magnesium comprising at least 10 weight percent magnesium,
   e. an alloy of aluminum, cadmium and magnesium comprising at least 0.5 weight percent magnesium,
   f. an alloy of aluminum, zinc and magnesium comprising at least 0.5 weight percent magnesium,
   g. an alloy of cadmium, zinc and magnesium comprising at least 1 weight percent magnesium, or
   h. an alloy of aluminum, cadmium, zinc and magnesium comprising at least 1 weight percent magnesium.

2. The electrode of claim 1 wherein the metal substrate is prepared from an alloy of aluminum and magnesium which contains less than 5 percent magnesium.

3. The electrode of claim 2 wherein the alloy contains from 0.5 to 2 percent of magnesium.

4. The electrode of claim 1 which is in the shape of a thin wire or foil.

5. The electrode of claim 1 wherein the carbon coating is from 100 to 6000 A thick.

6. A method of conditioning an electrode of composition as defined in claim 1 which comprises exposing such an electrode to the melt of an alkali metal polysulfide.

7. The method of claim 6 wherein the exposure is continued until no decrease in resistance is observed for a period of 7 days.

8. In a battery having a molten alkali metal anode and a molten alkali metal polysulfide catholyte separated by an alkali metal ion permeable membrane in the form of glass fibers which are filled with a molten alkali metal and immersed in a reservoir of molten alkali metal polysulfide, the improvement which comprises (placing the) an electrode of Claim 1 positioned in the polysulfide catholyte in close proximity to the glass fibers.

* * * * *

PO-1050
(5/69)

UNITED STATES PATENT OFFICE
CERTIFICATE OF CORRECTION

Patent No. 3,765,944              Dated October 16, 1973

Inventor(s) W. H. Taplin, III, R. O. Lindblom, and T. L. Caskey

It is certified that error appears in the above-identified patent and that said Letters Patent are hereby corrected as shown below:

Column 6, line 25, (Table 4d) should read:

-- 3-19     8:12     0.100-0.052     37     1.3 --

Signed and sealed this 14th day of January 1975.

SEAL)
Attest:

McCOY M. GIBSON JR.                C. MARSHALL DANN
Attesting Officer                  Commissioner of Patents